No. 731,529. PATENTED JUNE 23, 1903.
E. H. WHITE.
HOSE NOZZLE.
APPLICATION FILED FEB. 24, 1903.
NO MODEL.

WITNESSES:
H. A. Lamb
M. J. Sugden

INVENTOR
E. H. White
BY
ATTORNEY

No. 731,529. Patented June 23, 1903.

UNITED STATES PATENT OFFICE.

EVERETT H. WHITE, OF BRIDGEPORT, CONNECTICUT, ASSIGNOR TO THE EATON, COLE & BURNHAM COMPANY, OF BRIDGEPORT, CONNECTICUT, A CORPORATION OF CONNECTICUT.

HOSE-NOZZLE.

SPECIFICATION forming part of Letters Patent No. 731,529, dated June 23, 1903.

Application filed February 24, 1903. Serial No. 144,858. (No model.)

*To all whom it may concern:*

Be it known that I, EVERETT H. WHITE, a citizen of the United States, residing at Bridgeport, in the county of Fairfield and State of Connecticut, have invented certain new and useful Improvements in Hose-Nozzles; and I do hereby declare the following to be a full, clear, and exact description of the invention, such as will enable others skilled in the art to which it appertains to make and use the same.

My invention relates to hose-nozzles, and has for its object to improve upon the construction shown and described in Letters Patent No. 599,967, issued March 1, 1898, to Albert D. Laws.

The principal end aimed at by my invention is to provide a hose-nozzle of the type shown in said patent in which the interior spindle shall have no permanent integral projections such as would interfere with the ready application or removal of the packing and packing-retaining ring, while at the same time provision is made so that the spindle cannot be withdrawn from the body of the hose-nozzle unless the stuffing-box be first removed.

With these ends in view my invention consists in certain details of construction and combination of parts, such as will be hereinafter fully set forth and then specifically be designated by the claims.

Figure 1:
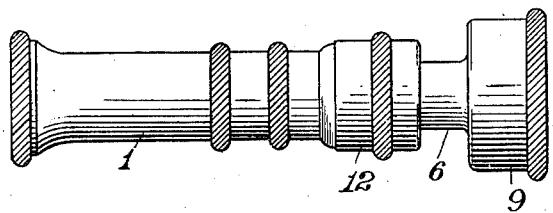
Figure 2:
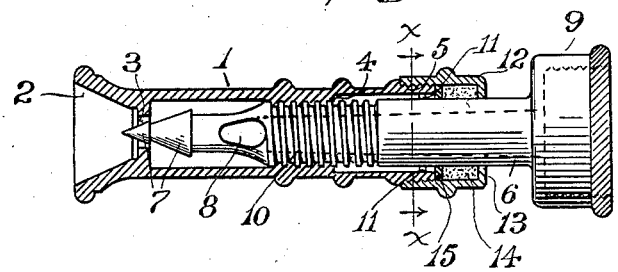
Figure 3:
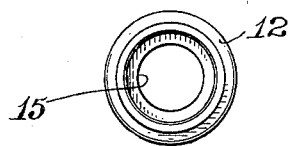
Figure 4:
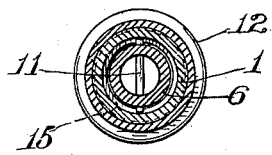

In the accompanying drawings, which form a part of this application, Figure 1 is a side elevation of my improved nozzle; Fig. 2, a sectional elevation of the same with the parts assembled in condition for use; Fig. 3, a detail interior view of the stuffing-box with the packing-ring contained therein, and Fig. 4 a section at the line *x x* of Fig. 2.

Similar numbers of reference denote like parts in the several figures of the drawings.

In the patented construction above referred to the rear extremity of the spindle is cylindrical and of uniform diameter up to the point where it adjoins the coupling-box which attaches to the hose, and at the forward end of this cylindrical portion is a cone shoulder, and a ring of packing material flanked by split metal packing-rings must be forced over this cone shoulder before said rings can assume their proper position upon said cylindrical portion. It will be readily understood that a ring of packing material, especially if formed of the usual wicking or other similar clinging substance, must be more or less mutilated and distorted by the act of forcing the same over this cone shoulder, and, moreover, these rings are not readily removed from the spindle, since the metal rings have to be sprung over the same with some sort of a tool, while the ring of packing material must be torn from the cylindrical portion in bits or else cut away bodily. My invention aims to obviate these disadvantages and will be best understood from the following description.

1 is the nozzle-body, having the flaring mouth 2 and contracted nozzle-opening 3, said body being interiorly threaded at or about its central portion, as seen at 4, and exteriorly threaded at its rear end, as seen at 5, all as shown and described in said patent.

6 is the hollow cone-spindle, having on its forward extremity the usual double cone 7 and provided with openings 8 (only one shown) near its forward end, while the rear end of said spindle terminates in an interiorly-threaded box 9 for attachment to a hose, all as and for the purpose set forth in said Letters Patent. At or about its middle portion the cone-spindle is exteriorly-threaded, as seen at 10, which thread engages with the interior thread of the nozzle-body, while at the rear of this threaded portion 10 the spindle presents a plain cylindrical body of a uniform diameter. In fact, the entire spindle between the box 9 and the openings 8 is cylindrical and of uniform diameter, since the apices of the threads are substantially flush with the circumference of the plain cylindrical portion. Near its forward end this plain cylindrical portion is pierced diametrically from one side to the other, so as to contain a small pin 11, which is dropped loosely through these holes thus pierced, the length of said pin being such that its ends will project beyond the cylindrical portion.

12 is the stuffing-box, whose forward end is threaded interiorly and is adapted to engage with the thread on the rear of the body portion 1, the rear end of this box being contracted to form a shoulder 13. 14 is the packing, which is confined within this stuffing-box between the shoulder 13 and a ring 15, which is driven into said box against the packing.

Presupposing the parts to be secured together in the manner shown at Fig. 2, they are readily detached by first unscrewing the stuffing-box from the body of the nozzle and then slightly retracting the spindle, so as to allow the pin 11 to drop out therefrom. The spindle may then be readily withdrawn from the body 1 and from the stuffing-box without in the slightest degree disturbing the packing or the ring 15.

When it is desired to put the parts together, the spindle is merely thrust through the stuffing-box, the pin inserted in place, and the spindle then properly assembled with respect to the body portion.

The advantages of my improvement will still further be appreciated when the fact is recognized that the stuffing-boxes may be fully equipped with the packing material and the packing-ring, so as to really constitute but a single element in the assembling of the parts of my improvement.

It will be observed that the tightening of the stuffing-box of course effects the proper compression of the packing and that there can be no danger of leakage.

Having thus described my invention, what I claim as new, and desire to secure by Letters Patent, is—

1. In a hose-nozzle, the combination of the body and spindle adapted to engage by means of suitable threaded portions, said spindle being cylindrical and of uniform diameter at its rear end, the stuffing-box secured to the rear end of said body by suitable threaded portions and containing suitable packing and disposed around said cylindrical portion of the spindle, and the pin loosely extending diametrically through said cylindrical portion and projecting therefrom, substantially as set forth.

2. In a hose-nozzle, the combination of the nozzle-body interiorly threaded at or about its central portion and exteriorly threaded at its rear end, the hollow spindle exteriorly threaded at or about its middle portion and terminating at its rear end in an interiorly-threaded connecting-box, said spindle immediately beyond said box being cylindrical and of uniform diameter and having throughout its length no permanent projection which extends beyond said cylindrical portion, the stuffing-box interiorly threaded at its forward end and adapted to engage the rear end of the nozzle-body while the rear of said stuffing-box is contracted into an annular shoulder, the ring within said stuffing-box, the packing confined between said ring and shoulder, and the pin extending diametrically and loosely through said cylindrical portion of the spindle and projecting beyond the surface thereof, substantially as set forth.

3. In a nozzle, the combination with a hollow body portion, of a spindle threaded into the same, a packing-ring removably carried by said body portion and surrounding said spindle, and a loosely-mounted removable abutment carried by said spindle for limiting the longitudinal movement of the same, substantially as described.

4. In a nozzle, the combination with a hollow body portion, of a spindle threaded into the same, a packing-ring removably carried by said body portion and surrounding said spindle, and a removable abutment carried by the spindle and revoluble therewith within said body portion, substantially as described.

5. In a nozzle, the combination with a hollow body portion, of a spindle threaded into the same, a packing-ring removably carried by the body portion and surrounding said spindle, and a pin removably extending through said spindle and movable therewith within the body portion, substantially as described.

In testimony whereof I affix my signature in presence of two witnesses.

EVERETT H. WHITE.

Witnesses:
 OLIVE E. WATROUS,
 KATIE M. E. STEWART.